US 7,736,453 B2

(12) United States Patent
Meyer et al.

(10) Patent No.: US 7,736,453 B2
(45) Date of Patent: Jun. 15, 2010

(54) METHOD FOR PRODUCING A FIRE PROTECTION GLAZING

(75) Inventors: Gerhard Meyer, Wesel (DE); Valentino Villari, Mönchengladbach (DE); Tobias Roth, Marl (DE); Nikolas Wirth, Dülmen (DE); Thomas Fenner, Dinslaken (DE); Paul Hendrikx, Venray (DE)

(73) Assignee: Scheuten Glasgroep, Venlo (NL)

( * ) Notice: Subject to any disclaimer, the term of this patent is extended or adjusted under 35 U.S.C. 154(b) by 882 days.

(21) Appl. No.: 10/560,758

(22) PCT Filed: Jun. 24, 2004

(86) PCT No.: PCT/EP2004/006897

§ 371 (c)(1),
(2), (4) Date: Nov. 15, 2006

(87) PCT Pub. No.: WO2005/002846

PCT Pub. Date: Jan. 13, 2005

(65) Prior Publication Data
US 2007/0272343 A1 Nov. 29, 2007

(30) Foreign Application Priority Data
Jul. 2, 2003 (EP) .................... 03015013

(51) Int. Cl.
*B32B 17/06* (2006.01)
(52) U.S. Cl. .................... 156/105; 156/106; 156/107
(58) Field of Classification Search ................ 156/105, 156/106, 107
See application file for complete search history.

(56) References Cited

U.S. PATENT DOCUMENTS

| 3,640,837 A | 2/1972 | Gaeth et al. ................. 161/165 |
| 3,934,066 A * | 1/1976 | Murch ........................ 442/221 |
| 4,175,162 A | 11/1979 | De Boel et al. .............. 428/428 |
| 4,259,273 A | 3/1981 | Nolte et al. ................... 264/42 |
| 4,444,825 A | 4/1984 | Vanderstukken et al. .... 428/215 |
| 4,654,268 A | 3/1987 | De Boel et al. .............. 428/426 |
| 4,738,704 A | 4/1988 | Vanaschen et al. ............ 65/106 |
| 4,830,913 A | 5/1989 | Ortmans et al. ............... 428/34 |
| 5,698,277 A | 12/1997 | Schueller et al. .............. 428/34 |
| 5,837,342 A | 11/1998 | Nolte et al. ................... 428/45 |
| 6,042,924 A | 3/2000 | Paulus et al. .................. 428/77 |

FOREIGN PATENT DOCUMENTS

| DE | 1 900 054 | | 8/1970 |
| DE | 27 52 543 | | 6/1978 |
| DE | 28 15 900 | | 10/1978 |
| DE | 35 09 249 A1 | | 9/1985 |
| DE | 35 30 968 A1 | | 3/1987 |
| DE | 36 15 225 A1 | | 11/1987 |
| DE | 44 35 843 A1 | | 4/1996 |
| DE | 195 25 263 A1 | | 3/1997 |
| DE | 100 02 277 A1 | | 8/2001 |
| EP | 494548 A1 | * | 7/1992 |
| EP | 882 573 A2 | | 12/1998 |
| WO | WO 01/70495 A1 | | 9/2001 |

OTHER PUBLICATIONS

International Search Report in PCT/EP2004/006897 dated Sep. 28, 2004.

* cited by examiner

*Primary Examiner*—Jeff Aftergut
*Assistant Examiner*—Jaeyun Lee
(74) *Attorney, Agent, or Firm*—Marshall, Gerstein & Borun LLP

(57) ABSTRACT

A method for producing a fire protection glazing including at least two flat substrates and a fire protection element, preferably transparent, including at least one film or a film system which includes at least one intumescent layer and is disposed between the substrates. Several segments of the film of the fire protection element are applied to a first substrate, wherein the film segments cover the entire surface of the substrate which is provided with a fire protection element. Afterwards a second substrate is arranged on the first substrate including the film segments and is exposed to a high pressure and high temperature binding treatment which can be carried out, for example in an antoclave.

22 Claims, No Drawings

METHOD FOR PRODUCING A FIRE PROTECTION GLAZING

BACKGROUND OF THE INVENTION

1. Field of the Invention

The invention relates to a method for the production of fire protection glazing, including at least two flat substrates and one transparent fire protection layer, whereby the fire protection layer includes at least one film or film system having at least one intumescent layer, and the fire protection layer is introduced between the substrates.

2. Related Technology

In order to produce fire protection glazing, it is a known procedure to employ intumescent materials that, within a glazing unit having at least two glass panes, form a transparent interlayer that expands in case of fire. When the layer expands, a considerable amount of energy of the occurring heat is absorbed by the water contained in the layer, which causes the water to evaporate. After the evaporation of the water, a foam-like heat shield is formed which, during the further course of the fire, assumes the function of heat insulation for the glass pane that lies behind the fire protection layer as well as for a room that is to be protected.

It is a known procedure to use hydrogels to form such fire protection layers. The main constituent of these hydrogel layers is usually water with admixtures of salts and stabilizing polymers. Here, the stabilizing polymers serve as gel formers. Such a fire protection layer consisting of a hydrogel is described, for example, in DE 35 30 968.

With the known methods for the production of intumescent layers for fire protection glazing, the material is applied into the glazing preferably by means of pouring, or by gel and by resin-casting methods in which the appropriate material is applied between two panes that are held apart from each other.

In the case of pouring methods, the intumescent material is poured onto a pane, after which the second pane is applied over it. Such a method is described, for example, in DE 44 35 843. Here, a drainage protection rim made of putty is placed onto a horizontally positioned glass pane, and then a fire protection solution is poured onto the glass pane. The water of the solution is removed by means of drying processes so that the layer solidifies to form a solid fire protection layer.

Conventional pouring methods, however, have a number of drawbacks. For example, time-consuming adjustment of the glass panes is necessary in order to avoid large thickness and moisture gradients over the pane. This is a serious problem especially in the case of large panes since, generally speaking, it is very difficult to handle such glass panes. Moreover, when the applied materials are drying, non-homogeneous drying conditions occur that lead to considerable quality problems and poor fire behavior due to non-homogeneities in the chemical composition and in the resultant physical properties in the x, y and z-directions. Furthermore, the dryers used define the dimensions of the panes that can be treated so that only a very limited choice of pane sizes is possible. There are likewise limits as to how the composition of the functional material can be varied since the drying process is very sensitive. Moreover, the drying process itself is very time-consuming and difficult to regulate.

The intumescent fire protection material can also be poured into an already joined double glass pane in which two panes are preferably positioned at a certain distance from each other by means of a frame-like holder. The space thus formed is then filled with the appropriate material. This is described, for example, in DE 195 25 263.

The known gel and casting-resin methods have various drawbacks. For example, only production in the final dimensions is possible since the pouring procedure can only be used with prefabricated double glazing having certain dimensions. The constructions are often very thick and heavyweight. In the case of thin layers, problems also arise in connection with the thickness tolerance over the larger dimensions. Due to the flowability of the gel, bulges are formed or even delamination between the gel and the pane can occur. A large problem is also posed by the edge sealing that is necessary to delimit the area of the gel that has been poured in.

Therefore, there is a need for a method for the production of fire protection layers with which the above-mentioned disadvantages do not occur. A major improvement is the approach of producing the fire protection layers separate from the glazing unit into which they are to be installed at a later point in time. DE 28 15 900, for example, discloses a method for the production of a solid layer of an intumescent material comprising hydrous or hydrated metal salts in which the fluid material is poured into a mold where it hardens.

DE 27 52 543 describes a method for the production of a light-permeable, fire-retardant glass pane with at least one solid layer made of hydrated sodium silicate, whereby the layer is sandwiched between two glass panes. The intumescent layer can be formed, for example, on the glass pane; it can be provided as a film on its own, or else it can consist of several layers.

DE 35 09 249 discloses a method for the production of a transparent fire protection sheet. With this method, an aqueous solution of an expandable material is applied onto a support, this layer is dried by applying heat until the residual water content ranges from 20% to 48% by weight and the expandable material thus obtained is applied as at least one layer onto at least one glazing pane.

Likewise known are fire protection means in the form of hybrid film systems in which at least one film is coated with intumescent material. Such film systems can be produced, for example, by means of a continuous, cascading process in which additional films or film layers are applied onto a base film.

Such film systems typically have at least one layer having a high elasticity so that the layer system exhibits advantageous mechanical properties and can be transported, stored and processed very well. In order to simplify the introduction into various environments, the film system can have at least one adhesive layer with which it can be introduced into various components of a glazing unit and can be affixed to the components.

Therefore, prefabricated fire protection films or film systems entail several advantages in comparison to conventional fire protection means. A major advantage lies, for example, in the flexible choice of the size of the fire protection glazing units that are to be produced, since the films employed can be cut into any desired size and can be processed in this form. In order to be able to realize correspondingly large glazing units, however, the introduction of the fire protection films into a glazing unit calls for methods that are adapted to the new circumstances.

In the realm of the production of laminated safety glass, it is likewise a known proce-dure to introduce functional films into glazing units. On this subject, for example, DE 36 15 225 A1 and DE 100 02 277 A1 describe special methods. However, the prior-art methods are not suitable for effectively introducing fire protection films into a glazing unit, since specific requirements have to be made of safety glass and these differ from those for fire protection glazing.

GENERAL DESCRIPTION OF THE INVENTION

Therefore, the invention provides an effective method for the production of fire protection glazing including a fire protection layer in the form of a film or of a film system. The method should be especially well-suited for the production of fire protection glazing units having a large surface area.

With the method according to the invention for the production of fire protection glazing, the glazing unit employed includes at least two flat substrates and one transparent fire protection layer including at least one film or of a film system having at least one intumescent layer. The fire protection layer is introduced between the two substrates. Several film sections of the fire protection layer are applied onto a first substrate, whereby the film sections cover the entire surface of the substrate that is to be provided with the fire protection layer. Then a second substrate is applied onto the first substrate having the film sections and a laminating process is carried out at elevated pressure and elevated temperature.

The individual film sections are preferably applied onto the substrate in such a manner that their edges abut each other and/or overlap slightly. Here, it has proven to be advantageous to affix the film sections onto the first substrate. For this purpose, the fire protection layer can be provided, for example, with an adhesive layer so that the film sections can be adhered to the substrate.

Various bonding modalities can be used for the adhesive layer. For example, water-soluble organic binders such as, for example, polyvinyl alcohols, cellulose derivatives, alcohols and/or polyalcohols have proven to be advantageous. Moreover, inorganic binders such as, for example, wetting agents having different moduli and degrees of dilution, silicic sols and/or water can likewise be employed. In an especially preferred embodiment of the invention, the adhesive includes glycerin or water or of mixtures thereof. In this case, preference is given to a mixture of approximately 85% glycerin and 15% water.

Another way to create the adhesive bond between the fire protection film and the glass substrate is to introduce the adhesive in the form of vapor. An especially preferred embodiment in this context is water vapor.

The advantage of adhesive processes is, among other things, that, by suitably combining the film or film system, the adhesive and the substrate, it can be avoided that bubbles become trapped in this laminate. Consequently, a bubble-free and thus optically flawless laminate can be formed. For this reason, it is also advantageous to employ an adhesive bond, for example, in the form of an adhesive layer, when applying the second substrate.

Another way to avoid detrimental bubble formation is a vacuum laminate. Here, the system to be laminated is loosely laid on top of each other in a laminator. Then an evacuation process is carried out, and the possibility exists to heat up the system. Subsequently, the system is put under atmospheric pressure at an elevated temperature in order to create a bubble-free pre-laminate of the substrates with the film system. Then a laminating process is carried out at elevated pressure and elevated temperature.

Due to the thermoplastic nature of the films employed, during the laminating process under elevated pressure and elevated temperature, the abutting edges flow together in such a way that they are no longer visible in the finished product. Consequently, a homogeneous, transparent fire protection layer is formed over the entire surface of the fire protection glazing. The envisaged fire protection effect is also ensured over the entire surface.

The method according to the invention has the essential advantage that fire protection glazing having a large surface area can be produced. Hence, in order to produce a unit having, for example, the standard dimensions used in the glass industry, namely, 3.21 m×6.00 m, it is not necessary to use a fire protection film in this size, which would lead to problems during the handling and the fixation procedure. Rather, it is possible to cover the entire surface with individual film sections without impairing the quality of the fire protection layer that is to be produced. Thus, fire protection glazing having a large surface area can be produced in a simple manner. Fire protection glazing having a large surface area, in turn, has the advantage that smaller units of any desired dimension and shape can be cut from it.

In an especially preferred embodiment of the invention, the pressure during the laminating process is about 1 bar to about 10 bar. In order to prevent the foaming effect of the fire protection film that acts as a fire protection from already becoming active during the production process, the temperature during the laminating process has to lie below the foaming temperature of the fire protection means. However, in order to achieve a melting of the film sections, the temperature has to lie within the thermoplastic range of the fire protection means.

Additional advantages, special features and advantageous refinements of the invention may be apparent from the presentation of preferred embodiments given below.

DETAILED DESCRIPTION

In an especially preferred embodiment of the method according to the invention, in order to produce fire protection glazing, a film or film system is introduced between two glass panes. A hybrid fire protection film is used as the fire protection layer. This film preferably includes several layers, at least one of which is intumescent. In another especially preferred embodiment of the invention, the layer structure is supplemented by a third substrate.

A hybrid film system can be produced, for example, by means of a continuous, cascading method in which, first of all, a film or film layer is applied and another film or film layer is applied thereupon, as well as optionally another film or films and/or film layer or layers is/are applied. At least two of these film layers have different chemical compositions, and at least one of the film layers is fire-retardant.

The term "fire-retardant" as employed in the sense of the invention is defined as a layer or film that is capable of absorbing the energy of a fire in order to protect structural components or building sections located behind the layer or film.

In order to enhance the mechanical properties of the fire protection layer, it is advantageous for the film system to have at least one layer having a high elasticity. Moreover, in order to simplify the application into various environments, it has been proven to be advantageous for the film system to have at least one adhesive layer that serves for the introduction into environments.

An especially advantageous embodiment of the invention is characterized in that at least one constituent of the film system has a siliceous base. This has the advantage that high fire resistance as well as good mechanical properties can be achieved. Thanks to the use of a siliceous base, the desired elasticity of the fire protection layer can be achieved already at relatively low contents of organic additives.

The variation of different properties within a single layer that can be laminated, for example, as a film, has the advantage that this makes the fire protection layer easier to produce.

Moreover, this makes it possible to achieve a high degree of transparency, assuming a low absorption in the visible spectrum.

The constituents can be varied in the case of a single layer as well as in the case of several layers that differ from each other.

In order to produce fire protection glazing using the method according to the invention, several film sections of the fire protection layer are applied onto a first substrate. The substrate is typically a glass pane, but other substrate materials can also be used. With the method according to the invention, in particular, fire protection units having a large surface area can be produced so that the dimensions of the substrate can be, for example, in the order of magnitude of the industrial standard dimensions, namely, width W=3.21 m×length L=6.00 m. However, larger or smaller substrates can also be used.

The glass pane can have been pretreated in various process steps that are necessary or advantageous for the production of a desired glazing unit. For example, functional layers can be applied that influence the transmission of the glazing unit that is to be produced.

On the first substrate, those areas that are to receive a fire protection layer are covered with film sections. The individual film sections can either be manufactured in the desired size or can be cut from a film having a large surface area. Making the film section from a film having a large surface area has the advantage that sections having any desired surface area can be cut out.

It has proven to be especially advantageous for the fire protection layer to have an adhesive layer on at least one side so that the film sections can easily be applied onto the first substrate and affixed thereto. The adhesion force of the adhesive layers employed can advantageously be adjusted so that an adaptation can be made to various surrounding materials such as glass, plastic or the like.

In an especially preferred embodiment of the invention, the film sections are applied onto the substrate in such a way that their edges abut each other and/or overlap slightly. During the laminating process that is carried out in order to fuse the film sections, these sections bond together in such a way that the abutting edges can no longer be seen and the appearance of the glazing produced by means of the production method according to the invention is not impaired.

According to the invention, a second substrate is applied onto the first substrate having the film sections. This section can also have already been pretreated in various process steps. These possible process steps also include further functional layers. Moreover, additional layers can be applied onto the film sections before the second substrate is applied onto the first substrate. The second substrate is preferably applied by affixing the substrates among each other. Here, for example, mechanical bonds or adhesions can be used.

In order to create a bubble-free laminate, the substrate laminate can also be produced as a vacuum laminate. Here, the system of layers to be bonded is loosely laid on top of each other in a laminator and subsequently evacuated. Then the system is preferably charged at atmospheric pressure at an elevated temperature and in this manner, a bubble-free pre-laminate is produced that can now undergo the actual laminating process.

In order to fuse the individual film sections with each other, the layer structure undergoes a laminating process at an elevated pressure and elevated temperature. This laminating process can be carried out in a device such as, for example, an autoclave. The duration of the laminating process is preferably in the order of magnitude of three to six hours. In an especially preferred embodiment of the invention, the laminating process takes four hours. This includes, for example, a heating phase of about one hour, a retention phase of about two hours and a cooling phase of about one hour.

In order to fuse the film sections, the temperature during the laminating process has to lie within the thermoplastic range. So that the fire protection layer does not already become active and expand during the production process of the glazing, however, the temperature employed has to lie below the foaming temperature of the fire protection layer. It has proven to be advantageous to select a temperature that is approximately 10° C. to 20° C. [18° F. to 36° F.] below the foaming temperature of the particular fire protection means layer. It has proven to be advantageous for the temperature to be at least 70° C. [158° F.]. Maximum temperatures of 150° C. [302° F.] have proven to be especially advantageous. In a particularly preferred embodiment of the invention, the temperature is in the order of magnitude of 80° C. to 100° C. [176° F. to 212° F.].

The pressure during the laminating process is preferably in the order of magnitude of one bar to ten bar. In an especially preferred embodiment of the invention, the pressure is bar to two bar.

During the laminating process, the film sections fuse with each other without abutting edges, between the sections being visible, and the finished product has a homogenous transparent fire protection layer. Moreover, the fire protection effect is ensured over the entire surface.

The invention claimed is:

1. A method for producing fire protection glazing, comprising at least two flat substrates and one fire protection layer comprising at least one film or a film system having at least one intumescent layer, the fire protection layer disposed between the substrates, said method comprising the following steps:
    applying several film sections of the fire protection layer onto a first substrate, whereby the film sections cover the entire surface of the substrate that is to be provided with the fire protection layer,
    applying a second substrate onto the first substrate with the film sections, and
    carrying out a laminating process at elevated pressure and elevated temperature, whereby the film sections are affixed by gluing onto the first and/or second substrate with glycerin or water or mixtures thereof as adhesive.

2. The method according to claim 1, wherein the fire protection glazing comprises more than two substrates.

3. The method according to claim 1, wherein the edges of the film sections abut each other and/or overlap slightly after being applied onto the first substrate.

4. The method according to claim 1, comprising laying the substrates and the film sections on top of each other in a desired layer structure in a laminator then evacuating the layer structure and charging the layer structure with atmospheric pressure under elevated temperature in order to create a pre-laminate.

5. The method according to claim 1, comprising using water-soluble organic binder for the adhesion process.

6. The method according to claim 5, comprising using at least one of polyvinyl alcohols, cellulose derivatives, alcohols and polyalcohols for the adhesion process.

7. The method according to claim 1, comprising using inorganic binders for the adhesion process.

8. The method according to claim 7, comprising using at least one of wetting agents having different moduli and degrees of dilution, silicic sols, and water for the adhesion process.

9. The method according to claim 1, comprising using a mixture of glycerin and water as the adhesive mixing glycerin to water in a ratio in the order of magnitude of 85% glycerin to 15% water.

10. The method according to claim 1, comprising introducing additional functional layers between the first substrate and the second substrate.

11. The method according to claim 1, wherein the pressure during the laminating process is in the range of about 1 to about 10 bar.

12. The method according to claim 11, wherein the pressure during the laminating process is about 1 bar to about 2 bar.

13. The method according to claim 1, wherein the temperature during the laminating process lies within the thermoplastic range of the fire protection layer and below the foaming temperature of the fire protection layer.

14. The method according to claim 13, the temperature during the laminating process lies 10° C. to 20° C. [18° F. to 36° F.] below the foaming temperature of the fire protection layer.

15. The method according to claim 1, wherein the temperature during the laminating process is at least 70° C. [158° F.].

16. The method according to claim 1, wherein the temperature during the laminating process is at least 80° C. [176° F.].

17. The method according to claim 1, wherein the temperature during the laminating process is at a maximum 100° C. [212° F.].

18. The method according to claim 1, wherein the temperature during the laminating process is at a maximum 150° C. [302° F.].

19. The method according to claim 1, wherein the duration of the laminating process about three to about six hours.

20. The method according to claim 19, wherein the duration of the laminating process is four hours.

21. The method according to claim 20, wherein the laminating process comprises a heating phase of about one hour, a retention phase of about two hours, and a cooling phase of about one hour.

22. The method according to claim 1, wherein the dimensions of the substrate are about 3.21 meters in width and about 6.0 meters in length.

* * * * *